United States Patent Office 3,534,090
Patented Oct. 13, 1970

3,534,090
HYDROCARBON OXIDATION
Howard S. Bryant, Jr., New York, N.Y., Ralph E. Ringelman, Beaumont, Tex., Joseph I. Savoca, Westfield, N.J., and Eugene R. Wiggen, Beaumont, Tex., assignors to Mobil Oil Corporation, a corporation of New York
Filed Nov. 4, 1966, Ser. No. 592,134
Int. Cl. C07c 63/02
U.S. Cl. 260—524                                                      16 Claims

ABSTRACT OF THE DISCLOSURE

Explosion hazards are eliminated when para-xylene or other liquid hydrocarbons are oxidized with an oxygen-rich gas dispersed in the liquid by employing an oxidation reaction system which is essentially completely full of liquid and thus devoid of any substantial vapor spaces where explosions could occur; guide vanes in the reactor, in its outlet and at the pump preclude cavitation and vortex formation in recirculating the reaction mixture through the reactor and external cooler circuit for temperature control and preventing stagnation in the reaction mixture; and gaseous material is later separated from the other reaction products in a different vessel under conditions which preclude explosions in the vapor space of the separator as by cooling the separation zone by recycling a cooler product liquid or slurry to it and/or by the use of gaseous or volatile diluents to alter the flammability characteristics of the vapor in the vapor space.

---

The present invention relates to an improved process for the oxidation of hydrocarbons in the liquid phase with a gaseous oxidizing agent under conditions which reduce operational hazards and/or increase the efficiency of the operation. One particular embodiment involves the oxidation of an alkyl benzene with an oxygen-containing gas, as exemplified in the liquid-phase oxidation of para-xylene to terephthalic acid.

Many serious problems involving safety, process efficiency, cost considerations, excessive wear of expensive equipment and loss of operating time for maintenance are encountered in the liquid-phase oxidation of hydrocarbons with gaseous oxidants on a commercial scale. In view of the elevated temperatures and pressures usually employed and the presence of high concentrations of oxygen and vaporizable, highly combustible organic compounds, the danger of explosions in such processes is always present. In the highly exothermic partial oxidation of p-xylene to terephthalic acid, careful temperature control is required not only for good yields but also to prevent any increase in the already considerable explosion hazards.

The present invention is a process for the oxidation of hydrocarbons in the liquid-phase which comprises oxidizing a liquid hydrocarbon with a gaseous oxidant dispersed there-through while maintaining a liquid-full reaction system free of any vapor spaces of substantial volume until said oxidation has proceeded substantially to the desired extent, and thereafter separating gaseous material from the liquid-phase of the reaction products in a separation zone under conditions not conducive to explosions in the vapor space of said separation zone. Although reactions of this type are sometimes referred to as mixed-phase reactions by reason of the presence of a gaseous reactant, the entire reaction system is maintained full of liquid or slurry and free of any vapor spaces of appreciable volume until the reaction product mixture reaches a separation zone where the gaseous phase is separated from the remainder of the reaction products. This is accomplished by means of one or more of a number of expedients including discharging reaction effluents from the tops of reactors and similarly keeping the transfer lines and pumps full of liquid so that there are no voids or spaces for vapor to accumulate, providing adequate agitation and circulation through the reaction system so that there are no stagnant zones where the gaseous material may separate, controlling or guiding the flow of liquid to eliminate any vortices or swirls resulting from the agitation and circulation by providing antivortex devices for straightening the flow of the liquid in certain locations.

Other aspects of the invention relate to eliminating or minimizing explosion hazards in the vapor space of the initial separation zone by one or more of such expedients as maintaining the reaction products in that zone at a substantially lower temperature than in the oxidation reaction system, or by altering the composition of the gaseous mixture in the vapor space to bring it outside of the explosive limits. Such alteration may be accomplished by introducing an inert gas (e.g., nitrogen) or a combustible, volatile hydrocarbon or by introducing both of these in order to change the composition of vapor in said space from a potentially explosive mixture into a nonflammable one under the prevailing conditions. The aforesaid cooling of the separation zone is preferably accomplished by mixing the fresh hot reaction effluent with a cooler stream of recycled nongaseous material derived from the reaction products. In one particular embodiment, the separation zone may be cooled with a recycle stream having a substantially lower content of suspended solid material than the reaction products.

Although the present invention is particularly suited for the oxidation of an alkyl benzene at an elevated temperature with an oxygen-containing gas to form an aromatic carboxylic acid, as exemplified by the oxidation by p-xylene with oxygen in producing terephthalic acid; it also has general application to the liquid-phase oxidation of other organic compounds. Other features and benefits of the invention will be apparent to those skilled in the art upon consideration of the detailed disclosure hereinafter.

For a better understanding of the nature and objects of this invention, reference should be had to the accompanying drawings and the following detailed disclosure.

Figure 1:
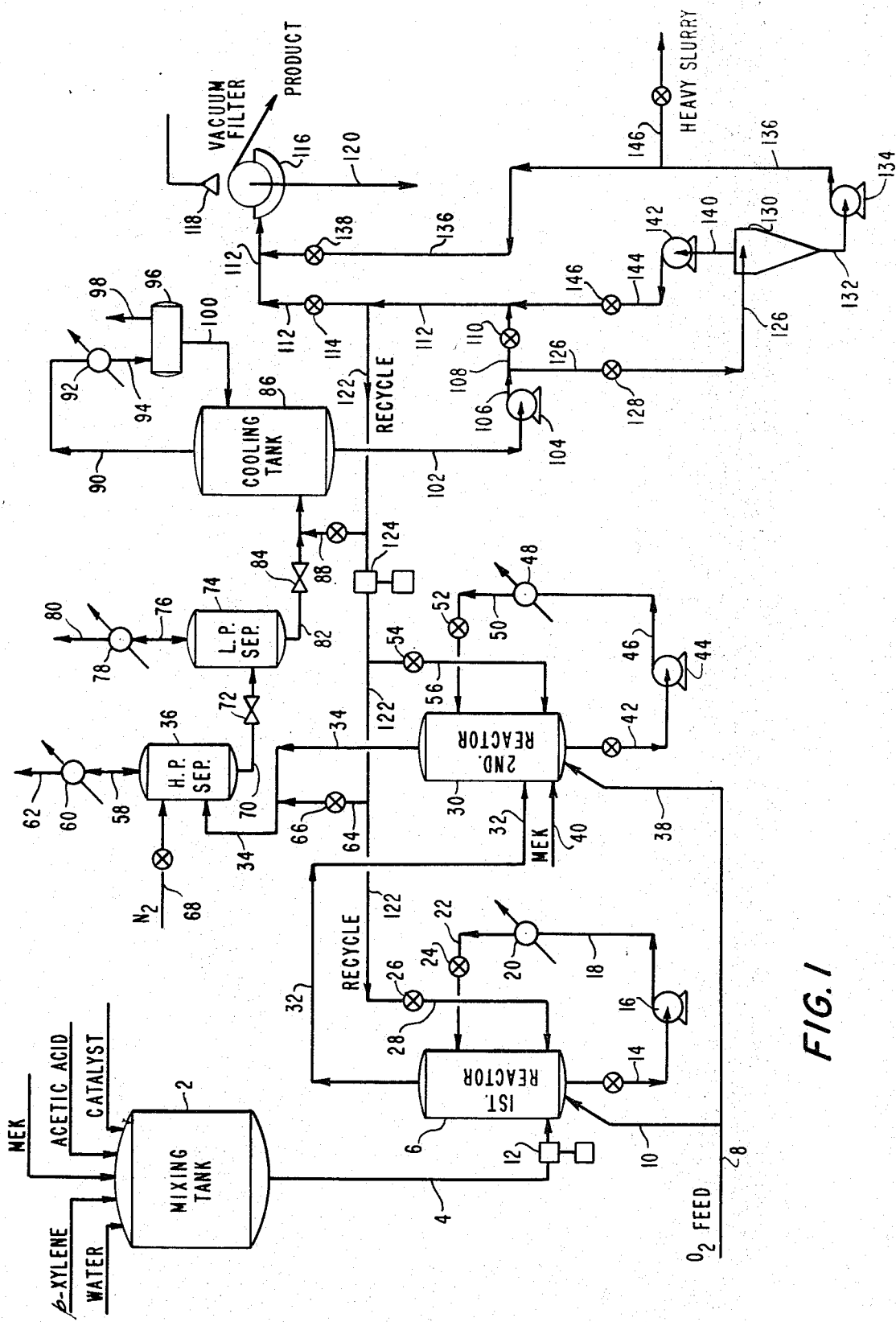
FIG. 1 is a flow sheet depicting one embodiment of the process of this invention. For clarity, a number of valves, control instruments and other accessories have been omitted in this simplified schematic showing inasmuch as the use of this equipment in a process of this type is well understood by those skilled in the art.

Turning now to FIG. 1 in which the present invention is illustrated in connection with the partial oxidation of p-xylene and recovery of the crude terephthalic acid product in a continuous process, unless otherwise indicated herein, the procedure in general may follow the process described by Ardis et al. in U.S. Pat. 3,036,122 which is incorporated herein by reference as an indication of preferred reactants, catalysts, reaction media, concentrations, proportions and other reaction conditions.

A charge mixture is prepared in a mixing tank 2 provided with a suitable agitator. This mixture contains demineralized water, fresh para-xylene feed, methyl ethyl ketone, a catalyst solution and acetic acid liquor as the reaction medium. The acetic acid liquor comprises material recycled within the process as the filtrate obtained when the crystalline terephthalic acid product is separated from the reaction product mixture in which acetic acid is a by-product and also leach mother liquor derived from a subsequent purification step in which the crude product is leached with fresh acetic acid. The catalyst solution is prepared by dissolving cobalt hydrate in recycled acetic acid. Thus, the solution in tank 2 contains not only fresh xylene and catalyst along with methyl ethyl ketone as an activator but also a substantial number of other compounds including reaction by-products, catalyst residues, and even a small amount of terephthalic acid in solution. The mixing tank and all other equipment exposed to acetic acid in this process are desirably constructed of an 18–8 type stainless steel or a material of similar corrosion resistance in order that a product of high purity may be obtained free of any contamination resulting from corrosion of the equipment.

The charge solution is delivered through transfer line 4 to the bottom of the first reactor 6 at a temperature of about 170° F. Commercially pure oxygen is also charged to the reactor through supply conduit 8 and branch pipe 10 leading to a sparger or distributing manifold located inside reactor 6 about midway between the top and bottom for dispersing the oxygen gas through the reaction mixture in the form of streams of small bubbles. The sparger and its location are described hereinafter in connection with FIG. 2.

The reaction in vessel 6 is carried out at a suitably elevated temperature to provide a fast reaction rate (e.g., 265° F.), and a reaction pressure of 250 pounds per square inch gauge pressure (e.g. hereinafter abbreviated as p.s.i.g.) is employed in the reactor to maintain the mixture in the liquid state. Consequently, the feed mixture in line 4 is charged to the reactor by means of the high pressure pump 12 and compressed oxygen is introduced through line 10 at a pressure in excess of 250 p.s.i.g.

While a feed preheater (not shown) may be utilized in line 4 for preheatnig the feed to the reaction temperature in starting up the reaction system, the oxidation reaction is exothermic and heat from an external source is not required during continuous operations. Instead, cooling is needed to hold the reaction temperature constant at 265° F. In one embodiment of the invention, this cooling is accomplished by circulating the reaction mixture through the loop consisting of bottom conduit 14, circulating pump 16, pipe 18, cooler 20 where the temperature of the circulating mixture is reduced to about 256° F. by indirect heat exchange with a suitable fluid coolant and return line 22 which is provided with a valve 24. That valve may be employed for controlling the flow and also in conjunction with the valve in pipe 14 for isolating the loop if other cooling means are employed. When this loop is in operation, the valve 26 in recycle branch line 28 is closed and circulation through the loop is maintained at a flow rate high enough both to provide sufficient cooling and to maintain in suspension the terephthalic acid crystals being formed.

There is a tendency for explosions to occur during liquid phase reactions of this nature, especially when relatively high feed charging rates are employed. Although the exact causes of such explosions have not been determined yet, it has been discovered that they occur in vapor spaces, including submerged spaces, in the reaction system and that such explosions may be prevented by the use of certain precautions. The first reactor 6 and second reactor 30 are both operated in the liquid full condition by discharging the reaction effluents in the form of liquid slurries overflowing from the tops of the reactors. The transfer line 32 carries the slurry leaving the top of the first reactor 6 to the lower part of the second reactor 30, and the discharge line 34 leads from the top of the latter to the high pressure separator 36. Thus vapor spaces and gas-liquid interfaces are eliminated in the upper sections of the two reactors. Both reactors are provided with agitators to maintain uniform reaction mixtures and prevent settling of solids suspended therein; and these agitators together with the relatively rapid flow through the reactor cooling loops tend to produce sizable vapor spaces within the body of the reaction mixture by cavitation and/or the formation of vortices at the outlets of the vessels and inlets of the circulating pumps. Suitable precautions for maintaining the reaction system in the liquid full state by preventing formation of such submerged vapor spaces are described hereinafter.

The partially reacted product from the first reactor is further reacted in reactor 30 for a total reaction time in the two vessels of 80 minutes. To promote further oxidation in the second reactor, additional compressed oxygen is introduced to a sparger near the middle of the length of reactor 30 from the supply conduit 8 and branch pipe 38. Also an additional supply of the activator, methyl ethyl ketone, is introduced by means of a high pressure pump through the conduit 40 into the bottom of this reactor in order to maintain the catalyst activity at a constant high level. Both reactors are operated at substantially the same temperature and pressure, and reactor 30 also may be cooled by a reaction mixture circulating loop comprising bottom outlet line 42, circulating pump 44, pipe 46, cooler 48 and a return line 50 leading to the upper part of the reactor and provided with a valve 52. This cooling loop is operated in a manner similar to that in the first reactor with the valve 54 in the recycle branch line 56 closed.

During the reaction, the p-xylene is oxidized by the oxygen to the desired terephthalic acid and minor amounts of other oxidation products, especially p-toluic acid and p-carboxybenzaldehyde. Small amounts of other xylenes and ethyl benzene are present in the charge as impurities and these substances oxidize to form additional by-products in the reaction mixture. The terephthalic acid is only slightly soluble in the hot reaction medium which comprises mainly acetic acid; hence most of the product crystallizes and produces a slurry containing about 15% of solids by the time the reaction is completed.

Instead of utilizing the reactors in a series arrangement, they can be operated in parallel with the charge divided between them. The parallel set up provides the advantage of allowing one reactor and its cooling loop to be shut down for cleaning or repairs while the other reactor remains onstream to keep the rest of the plant operating at a reduced but still substantial rate of production.

The reaction product mixture overflows from the top of reactor 30 and travels via conduit 34 to the high pressure separator 36 where the gas and liquid phases of the reaction slurry are separated at a temperature of 283° F. and a pressure of 250 p.s.i.g. The temperature here is somewhat higher than that of the second reactor as a result of the continuation of the reaction after leaving the zone affected by the cooling system; but it may be substantially the same as the temperature of the final reactor. The oxygen-containing vapor phase is withdrawn from the top of separator 36 through a reflux line 58 to a water-cooled condenser 60. The gas exit line 62 is equipped with a conventional automatic pressure controller (not shown) to maintain the elevated pressure on this separator and the reaction system. While a gaseous mixture chiefly containing unreacted oxygen and by-product carbon dioxide is removed in line 62, normally liquid components in the vapor phase are condensed in the condenser 60 and drain back to the separator in line 58 which should be of suitably large diameter to accommodate this reflux action.

A substantial vapor space is necessary in the upper portion of separator 36. However, there is a distinctly lower explosion potential here as a result of the conversion of most of the vaporizable and highly combustible xylene to solid terephthalic acid, the consumption of much methyl ethyl ketone, the formation of a considerable amount of inert carbon dioxide and the much lower oxygen concentration. Nevertheless, other combustible substances, such as unconsumed ketone, methyl acetate and acetic acid are present in the vapor; therefore, in at least some instances, including start-up operations wherein the separator usually contains abnormally high concentrations of xylene, the ketone and oxygen until steady reaction conditions are attained, extra care is often advisable to preclude any possibility of an explosion.

In certain embodiments of this invention, a cooler stream of reaction product slurry or a dilute form of such slurry (i.e., a slurry having a lower content of undissolved solids) may be recycled from sources described hereinafter through branch conduit 64 and valve 66 and introduced at a temperature of about 180° F. into the hot reaction slurry in transfer line 34 upstream of separator 36. The temperature of the mixture in separator 36 may be reduced to 225° or even as low as about 190° F. by recycling a slurry, and this temperature reduction produces an even greater reduction in the explosion potential. Cooling at this stage crystallizes some of the dissolved terephthalic acid, and a significant advantage of the direct cooling with recycle slurry is that is produces no solid deposits on equipment walls whereas employing conventional cooling techniques such as installing an indirect heat exchanger in transfer line 34 or a cooling jacket around separator 36 would result in rapid accumulation of deposits on the cold heat transfer surfaces with an attendant reduction in cooling efficiency and need for frequent cleaning of the surfaces.

In another modification of the invention, any tendency towards an explosion in the high pressure separator may be eliminated or at least minimized by the introduction of an inert gas or vapor (i.e., a gas that does not react with any components of the reaction mixture and which is both incombustible and incapable of supporting combustion) through the valved line 68 under sufficient pressure into the vapor space of separator 36 at a rate at least sufficient to reduce the oxygen concentration in that space below the lower explosion limit for the particular vapor composition and temperature existing in the separator. Nitrogen is preferred for the purpose, but steam, flue gas and carbon dioxide are also among the many suitable inert agents, and even air may serve the purpose if a sufficient quantity is introduced.

Also a volatile combustible material such as ethane or butane may be introduced to raise the concentration of combustible material in the vapor above the upper explosive limit. With certain substances, such as butane, an additional cooling effect can be obtained by introducing the butane as a liquid in either line 68 or the transfer pipe 34 and allowing it to vaporize in the separator thereby cooling the separation zone to a safer temperature. A hydrocarbon of this nature is condensed in the condenser 60 and may be recirculated or recycled back to the high pressure separator 36 either in the reflux line 58 or in a separate conduit. In another embodiment, the condensed butane may be returned instead to the reactor 6. This latter technique may be particularly desirable in co-oxidation processes wherein both butane and p-xylene are being simultaneously oxidized in the process. Still further it is contemplated that both an inert gas and a combustible material may be added to the vapor space in the separation zone 36 to reduce the explosion hazard.

Such introduction of inert and/or a combustible agent may be utilized alone or jointly with a cooling recycle stream from line 64 for eliminating explosion hazards. The admission of inert gas is particularly desirable during the start-up of the system.

In this continuous process the slurry is continuously withdrawn from separator 36 through pipe 70 equipped with an automatic pressure regulating valve 72 which allows the pressure to drop to 14 p.s.i.g. for introduction into a low pressure separator 74. Both separators 36 and 74 may be provided with propeller-type agitators (not shown) rotating on horizontal shafts at speeds sufficient to maintain the solid particles of the slurry in suspension. The temperature of the slurry in separator 74 is about 256° F., or substantially lower in instances where a cooling recycle stream is introduced upstream of separator 36. Separator 74 is also provided with a reflux line 76, condenser 78 and an exit line 80 for the further discharge of incondensable gas from the product slurry while normally liquid components in the vapor phase are condensed and drained back to the separator through reflux line 76. An automatic pressure regulating valve (not shown) is provided in the exit line 80 for maintaining the desired pressure on separator 74. Although, the possibility of an explosion in the vapor space of the low presure separator seems to be relatively remote in this particular oxidation process, it is contemplated that an inert gas may be introduced into separator 74 as an extra precaution.

The liquid phase is removed from the bottom of this vessel 74 in transfer line 82 and passes through an automatic pressure regulating valve 84 on its way to the cooling tank 86. This tank is maintained under a subatmospheric pressure of 7.7 p.s.i. absolute and a temperature of 180° F., and a rotating turbine or paddle wheel agitator may be installed therein to keep the solid particles suspended in the liquid. To avoid any tendency for the rather hot slurry from separator 74 to flash and thereby generate a large volume of vapor upon entering tank 86, recycled crude product slurry or the dilute slurry described later is introduced via the valve recycle branch line 88 into the slurry in transfer line 82 between the pressure regulating valve 84 and the tank 86. Even in cases where the product suspension is at at temperature low enough to preclude flashing, the recycle stream is useful in maintaining sufficient circulation through tank 86 to prevent the settling of solids. Also, the bottom of this tank may be constructed in the form of a steep cone leading down to a central outlet thereby avoiding stagnant zones and horizontal surface areas on which solid particles might accumulate by settling out of the suspension. With such construction, the normal flow of the slurry, including the aforesaid recycle stream may well be adequate to maintain the solids in suspension in the absence of an agitator.

In some instances, it may be desirable to eliminate the agitators in separators 36 and 74 by providing them with steeply conical bottoms and, if necessary, employing additional local circulation at the bottom of each separator by recycling part of the slurry as, for instance, by recycling a portion of the slurry leaving in bottom discharge line 70 to the inlet line 34 of separator 36.

The product slurry is cooled in tank 86 to a temperature suitable for the vacuum filtration described later and this tank also serves as a storage vessel for the crude product slurry in the filtering operation. Cooling is accomplished here by the application of suction which draws vapor only from tank 86 through the overhead line 90 to a reflux condenser 92 where normally liquid components of the vapor are condensed. The resulting gas-liquid mixture then passes through line 94 to the reflux accumulator 96 from which the gaseous phase is withdrawn overhead in line 98 which is connected to a conventional vacuum source (not shown), such as a steam or water jet aspirator or a vacuum pump. The cooled condensate or liquid phase is returned to the tank 86 via the drain line 100 which extends beneath the surface of the liquid in tank 86. Thus, cooling is produced by evaporation in the tank and the return of cold condensate at a temperature of about 100° F. to the slurry therein; thus reducing the product slurry temperature to 180° F. This temperature is considered an optimum for filtration under a moderate subatmospheric pressure as the liquor is still hot enough to retain most of the by-products, especially p-carboxybenzaldehyde, in solution but not so hot that it flashes into vapor during filtration.

The separation and cooling technique is capable of considerable modification. For instance, the low pressure separator 74 may be omitted and the slurry leaving high pressure separator 36 may pass through a single pressure reduction valve en route to cooling tank 86, and the latter tank may be operated at atmospheric pressure rather than under vacuum.

In one embodiment of the invention, the cooled slurry is withdrawn from tank 86 through the bottom line 102 and forced by pump 104 through pipe 106, conduit 108 containing valve 110, line 112 and valve 114 en route to the vacuum filter 116. In this vacuum drum filter, the terephthalic acid crystals are deposited on the cylindrical filtering surface of the drum and subsequently washed thereon at a later stage of the drum rotation with a spray from a row of nozzles 118 of recycle acetic acid derived from a subsequent purification step. The washed product cake is removed from the filter in the usual manner and the liquid reaction medium and wash acid are drawn off in line 120 leading to a mother liquor surge drum (not shown) maintained under a constant subatmospheric pressure. Part of this acetic acid mother liquor is recycled to the charge mixing tank 2 and the remainder is subjected to other processing for the recovery of useful components. Another portion of the cooled product slurry may be diverted from pipe 112 through the recycle conduit 122 for delivery to the branch recycle line 88 for the purpose of cooling the mixture entering cooling tank 86.

In another embodiment of the invention, the relatively cool slurry stream in recycle line 122 also passes to the high pressure pump 124 which forces the slurry further along conduit 122 into branch line 64 for introduction into the hot reaction products stream in transfer line 34 as mentioned earlier.

This recycled slurry may also be introduced through valves 54 and 26 and conduits 56 and 28 respectively, into the lower portions of either or both of reactors 30 and 6 as a coolant for holding these reactors at the desired temperature. When this cooling technique is employed, the reactor cooling lops are shut off by closing the valves 24 and 52 and those in lines 14 and 42, or the cooling loops may be eliminated entirely.

In a further embodiment of the invention, the product slurry is concentrated to a solids content of about 40% in a liquid cyclone ("clone"), or less desirably a centrifuge, to prepare the crude product particles for initial purification by leaching with or without prior filtration, and the concentrating device also delivers a recycle liquor or dilute slurry of about 1% solids concentration. Such concentration greatly improves the efficiency of filtration. In addition, the recycle liquor is much easier and more economical to handle and transport than a 15% slurry inasmuch as special pumps are not required, and this dilute slurry produces considerably less wear on valves and other process equipment. Further when this recycle liquor is used to cool the two reactors it may reduce the solids concentration of the reaction slurry from about 15% to about 3 to 5% not only in the two reactors but throughout the system with attendant benefits.

To split the 15% product slurry into concentrated and dilute slurries in this fashion, valves 110 and 114 are closed and the cooled slurry from tank 86 passes through pipe 102, pump 104, line 106, and then into pipe 126, with the previously closed valve 128 now in the open position, enroute to the liquid cyclone 130 where it tangentially enters the broad annular upper chamber at high velocity. This creates a vortex in which essentially all of the larger solid particles (i.e., most of the solids on a weight basis) are thrown against the wall of the cyclone by centrifugal force, and these particles settle in a spiral fashion downward along the conical lower wall section to the bottom of the apparatus. The heavier particles are withdrawn from the bottom outlet in a concentrated slurry of relatively small volume via line 132 by a suitable heavy slurry pump 134, and pumped through the transfer pipe 136 and the previously closed valve 138 which is now in the open position into line 112 and then to the filter 116. Pump 134 is of a variable capacity type and its operation is carefully regulated to draw only a heavy or highly concentrated slurry containing approximately 40% by weight of solids from the bottom of the liquid cyclone 130. Meanwhile, a much larger volume of a dilute slurry of the finer particles and containing only about 1% by weight of solids is rising within the central cylindrical partition in the upper part of the cyclone. This stream is drawn overhead through the exit line 140 by pump 142 which forces the liquor through pipe 144 and the now open valve 146 into line 112, then into recycle conduit 122, since valve 114 is now closed.

The recycle liquor or dilute slurry may be utilized in the same manner as indicated earlier for the normal product slurry, but it poses far fewer handling problems than the 15% slurry. Thus, it may be employed to cool the slurry entering tank 86 and/or to cool the reaction effluent entering the high pressure separator 36; moreover, this recycle liquor may be directed through branch recycle lines 28 and 56 to cool either or both of the two reactors and obviate the need for operating one or both of their reactor cooling loops.

Cooling the reaction mixture to maintain a desired reaction temperature by recycling either 15% product slurry or a dilute slurry to either or both of the reactors provides a number of benefits in shifting most or all of the cooling load for the entire oxidation process substantially completely (i.e., excepting the small cooling loads of reflux condensers 60 and 78) to the condenser 92 associated with cooling tank 86. Only vapor phase material reaches condenser 92 for cooling and the resulting condensate is of course, a liquid; hence no problems from blockage of the condenser or poor heat transfer due to the accumulation of solid materials therein arise. On the other hand, the deposition of solids from slurries of about 15% concentration is likely to occur in the operation of the coolers 20 and 48 of the two reactor cooling loops even when such slurries are cooled only a few degrees in each pass through the coolers. Crystallizing terephthalic acid particles accumulate on the chilled heat exchange surfaces with a decrease in efficiency and increase in pumping costs and such deposits may eventually plug the heat exchange tubes or passages, so these coolers must be shut down and cleaned at regular intervals.

It is also contemplated that the reactors may be cooled by a combination of indirect cooling with the loop coolers and direct cooling with recycle slurry to permit the reactors to remain on stream for longer periods between shut downs for cleaning the coolers. Also cooling of a reactor with recycle slurry may be employed at intervals in order that the cooling loop only of that reactor may be shut down for cleaning with halting production in the reactor.

In view of the difficulties encountered in handling relatively concentrated slurries containing, say 10% or more of solids, extra benefits are realized in recycling a dilute (1%) slurry to any of the two reactors, separator 16 or cooling tank 86 as the weak slurry may be used to dilute a typical reaction slurry from a solids content of 15% to, say, 3 or 5%. Such dilution will permit the substitution of conventional pumps in some locations for special slurry pumps and minimize the maintenance mentioned earlier.

In another embodiment of the invention utilizing the liquid cyclone 130 to concentrate the slurry, it is possible to dispense with the filter 116 and deliver the heavy or concentrated slurry in transfer line 136 directly via pipe 146 to a subsequent leaching operation for purification. This slurry of about 40% solids concentration may require more thorough leaching than the washed filter cake obtained from filter 116 because it usually has a higher total content of impurities. Nevertheless, eliminating the filtration step reduces the cost and simplifies the process, and this technique is likely to be particularly suitable in instances where extremely high product purity is not a primary consideration.

Figure 2:
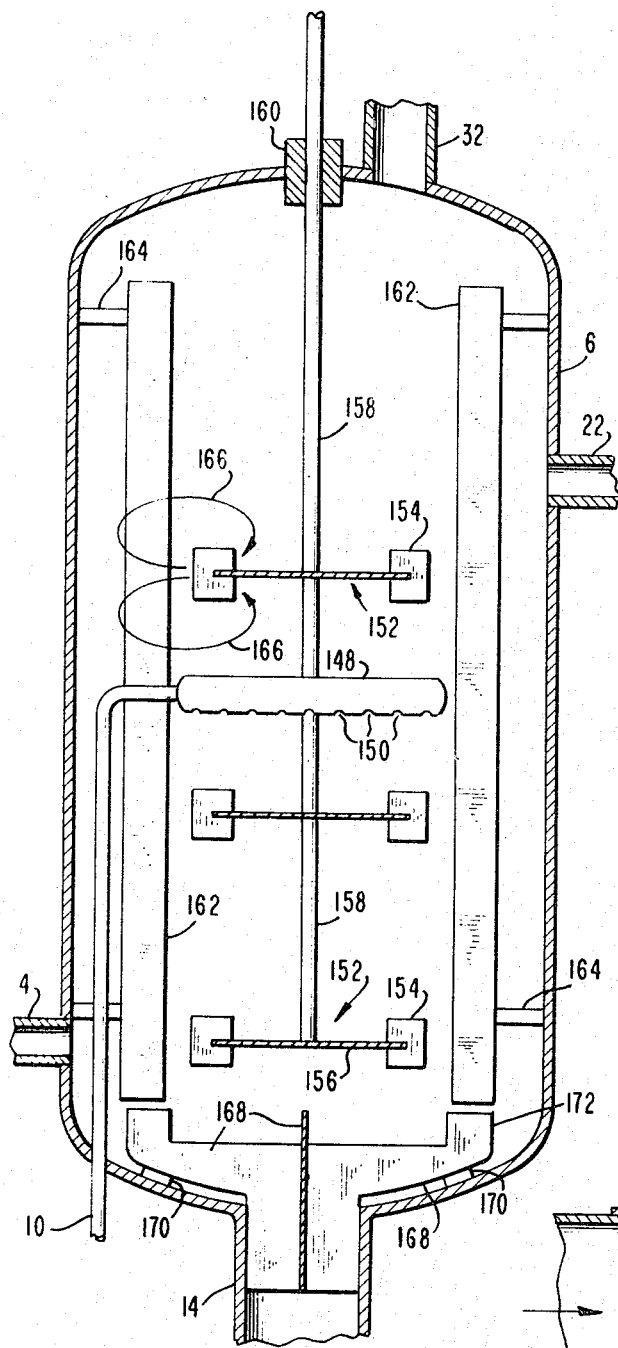
FIG. 2 is a vertical section view of a reactor equipped with an agitator and baffles which prevent or minimize the formation of spiral flow patterns in liquids.

FIG. 2 is a sectional view taken on the center line of the first reactor 6 showing the internal arrangement and provisions therein for maintaining the reactor free of any vapor spaces, and reactor 30 is of essentially the same construction. The liquid charged to the reactor is admitted into the lower section from the pipe 4 and the oxidizing gas, usually undiluted oxygen, is introduced via the branch supply line 10 to the manifold or sparger 148 which is provided with a large number of bottom orifices 150 of about 0.12 inch diameter. This sparger distributes the oxygen widely in small bubbles throughout the body of the liquid reaction medium. The overall flow of the liquid reaction mixture is from the charge line 4 upward in the reactor and out through the top discharge line 32 which carries it to the second reactor; hence, there is no vapor space in the upper section or anywhere in the reactor. For maintaining uniform reaction conditions and keeping the solid particles produced in suspension, good agitation is desirable; and this also prevents the coalescing of small oxygen bubbles to form any vapor spaces of substantial volume in the reactor. One suitable apparatus for agitation is shown in FIG. 2 in the form of three rotating paddle wheel or turbine-type agitators 152 each consisting of a plurality (e.g., six) of flat blades 154 welded to a flat disc 156 which in turn is rigidly attached to the rotating shaft 158. This shaft extends through a stuffing box or packing gland 160 (schematically indicated) in the top of the reactor 6 and is driven by a conventional driving means (not shown).

The rotary motion imparted to the fluid reaction mixture by the paddle wheel agitator, or by certain other conventional types, is likely to create vortices or eddies in certain locations in simple cylindrical vessels, for example, adjacent to the center of the top of the vessel. This circular motion in combination with the rapid circulation of the reaction mixture out the bottom line 14 through the cooling loop and back into the reactor via the return pipe tends to produce spiral motion and a sizable vortex at the bottom center. Such vortices, especially where a gas is dispersed throughout the liquid medium, tend to produce vapor spaces of substantial volume in which explosions might occur. However, the general rotation of the body of fluid about a vertical axis is minimized in the present reactor by means of the radially disposed, vertical baffles 162 which are affixed to supports 164 attached to the shell of the reactor. In the particular embodiment shown, these baffles are simply flat metal strips which may, for illustration, be approximately 3 inches wide and spaced several inches away from the shell of the reactor. About four or more of such baffles are preferred for most purposes. These baffles direct the flow of the fluid from the agitator blades 154 in such manner as to produce mainly a double toroidal circulation in the region of each paddle wheel 152 as indicated by the pair of curved arrows 166 while substantially nullifying the horizontal rotation of the fluid body as a single body. This control of the movement of the fluid reaction mixture not only practically eliminates the formation of a vortex at the top of the reactor and substantially reduces the tendency toward a similar swirling at the bottom, but also it is believed to produce a superior mixing action over that obtainable without baffles 162.

However, the proclivity toward formation near the reactor bottom of a vortex which extends well down into the bottom line 14 and well up into the reactor is rather strong; hence, additional precautions are necessary. Such swirling or vortex action is similar to that which is observed in the draining of water from a bathtub. This vortex and the resulting void of vapor space may be eliminated by preventing spiral flow of the fluid slurry in the region of the inlet to pipe 14. Various devices may be utilized for the purpose, usually taking the form of baffles or vaned structures having directional flow vanes oriented to impart maximum resistance to spiral flow, especially in a plane perpendicular to the desired direction of flow, and preferably offering a minimum resistance to straight or nonrotary flow. In the embodiment illustrated in FIG. 2, the flow directing device is a cross baffle composed of relatively thin, vertical metal plates 168 disposed at right angles to one another in producing a structure having a horizontal cross section in the form of an X. As may be seen from the drawing, this cross baffle extends both upward and downward, preferably for a similar distance, from the bottom of the reactor on which the baffle is supported by the lugs 170 on each vane 168. Upper sections 172 of the vanes are desirably located adjacent to and preferably in alignment with the lower ends of the baffles 162. For purposes of clearer illustration, the diameter of pipe 14 and the lower end of the cross baffle have been exaggerated somewhat in FIG. 2.

Figure 3:
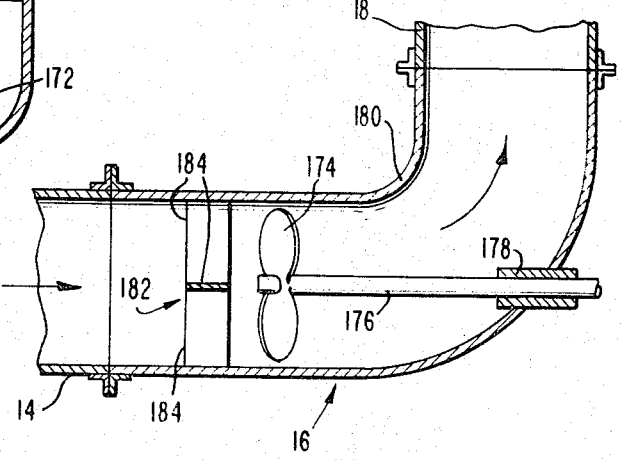
FIG. 3 is a longitudinal sectional view of an axial flow, propeller-type pump equipped with an antiswirl device at the suction side or inlet of the pump.

FIG. 3 is a schematic longitudinal section view of an axial-flow propeller pump 16 suitable for circulating the reaction mixture rapidly through the cooling loop associated with reactor 6 in FIG. 1; pump 44 is usually of identical construction. This axial-flow pump consists essentially of a 5-bladed propeller 174 mounted on a rotating shaft 176 which passes through a stuffing box 178 mounted in the pump casing 180 and is coupled to an external electric motor (not shown). The pump casing 180 is in the form of a curved tube forming a bend of approximately 90 degrees and preferably having a diameter equal to that of the lines 14 and 18 to which it is connected by bolted flanges or other suitable means. Propeller 174 has a configuration similar to that of a conventional marine propeller, and the performance of this type of pump is superior to that of the common centrifugal pump for handling moderately heavy slurries (10–20% solids) of the type involved here.

A relatively high circulation through the reactor cooling loops is usually employed to maintain the solids in suspension without settling and also because of the intentionally small drop of only a few degrees F. in the temperature of the reaction mixture during each pass through the coolers 20 and 48 respectively. In general, there is distinct tendency at high pumping rates towards cavitation or the formation of a substantial void or vapor space at or near the pump suction inlet as a result of the swirling action of the liquid in that location. This proclivity is increased by the presence of a large number of gas bubbles dispersed throughout the reacting mixture, and the vapor in any such vapor space is usually of a potentially explosive nature. However, the undesirable cavitation voids or vapor spaces can be eliminated or at least minimized in several ways. A larger pump may be employed with a propeller of greater diameter rotating at a lower speed. However, it is usually preferable to install an antiswirl device as exemplified by the cross baffle 182 at the suction end of the pump and spaced not more than a few inches from the propeller 174. This swirl breaker operates on the same principle as the antivortex device in FIG. 2, and it is composed of a plurality of, say 4, flat metal vanes joined together at the center as the horizontal and vertical vanes 184 shown in FIG. 3. This device has a cross section in the form of an X and it fits snugly within the tubular pump casing 180 to which it may be secured by any appropriate method, such as welding. In order to obtain maximum pumping efficiency, the width of these vanes 184 in the direction of fluid flow is desirably no greater than necessary to prevent cavitation because they do increase the frictional loss. For example, the width of vanes may desirably be of the order to 10% to 50% of the pump casing diameter. If necessary or desirable, both a larger pump and an antiswirl device may be utilized in combination.

The greatest danger of explosions exists in the oxidation reaction system in general, and the initial reactor in particular, as the concentration both of oxidizing gas and potentially vaporizable, unreacted hydrocarbons is greatest there. However, the procedures described for maintaining the entire reaction system full of liquid, including eliminating or at least minimizing any vortices, swirls or cavitation which might cause vapor spaces of significant volume within the body of liquid, substantially preclude any possibility of explosions in this section of the system.

While the above disclosure has been concerned to a considerable extent with specific embodiments concerned with the reaction of p-xylene with oxygen, it will be readily apparent to those skilled in the art that the principles of this invention are capable of far broader application and that the various embodiments disclosed are subject to many modifications within the scope of this invention; therefore, the invention should not be construed as limited in any particulars except as may be recited in the following claims or required by the prior art.

We claim:

1. A process for the oxidation of hydrocarbons in the liquid phase which comprises oxidizing a liquid hydrocarbon at a temperature sufficiently elevated to provide a fast reaction rate with a gaseous oxidant dispersed therethrough while maintaining a liquid-full reaction system free of any vapor spaces of substantial volume until said oxidation has proceeded substantially to the desired extent and thereafter separating gaseous material from the liquid phase of the reaction products in a separation zone under conditions not conducive to explosions in the vapor space of said separation zone.

2. A process according to claim 1 in which an alkyl benzene is oxidized at an elevated temperature with an oxygen-containing gas to form an aromatic carboxylic acid.

3. A process according to claim 1 in which p-xylene is oxidized at elevated temperature and pressure with oxygen to form terephthalic acid.

4. A process according to claim 1 in which an inert gas is introduced into the vapor space in said separation zone at a rate sufficient to convert a potentially explosive vapor mixture in said space into a vapor mixture which is substantially nonflammable under the conditions prevailing in said separation zone.

5. A process according to claim 4 in which said inert gas comprises at least a major proportion of nitrogen.

6. A process according to claim 1 in which a gaseous combustible agent is introduced into the vapor space in said separation zone at a rate sufficient to convert a potentially explosive vapor mixture in said space into a vapor mixture which is substantially nonflammable under the conditions prevailing in said separation zone.

7. A process according to claim 6 in which a volatile hydrocarbon is introduced into said separation zone in the liquid state and vaporizes therein to lower the temperature in the vapor space of said separation zone thereby reducing the explosion hazard in said zone.

8. A process according to claim 6 in which a dialkyl benzene is oxidized at elevated temperature with an oxygen-containing gas to form a benzene dicarboxylic acid, and liquid butane is introduced into said separation zone and vaporizes therein to lower the temperature of the vapor space.

9. A process according to claim 1 in which said separation zone is maintained at a temperature substantially lower than said rection system and sufficiently low to substantially reduce the explosion hazard in the vapor space in the separation zone.

10. A process according to claim 9 in which said reaction products are cooled with a recycled and substantially cooler stream of nongaseous material derived from the products of said oxidation reaction.

11. A process according to claim 10 in which said recycled material has a substantially lower content of suspended solid material than said reaction mixture.

12. A process according to claim 1 in which the reaction product and a substantially cooler recycled stream of nongaseous material derived from the products of said oxidation reaction are introduced into said separation zone, and a volatile material is admitted to the vapor space of the separation zone at a rate sufficient to maintain a nonflammable gaseous phase in the separation zone under the conditions prevailing therein.

13. A process according to claim 12 in which said volatile material is an inert gas.

14. A process according to claim 1 in which the reaction mixture is continuously circulated in the reaction system and the flow of said mixture is guided therein to eliminate voids of substantial volume within said mixture.

15. A process according to claim 14 in which tendencies toward spiral flow patterns in the flow of said reaction mixture are eliminated by guiding the flow thereof in predetermined locations into essentially straight line flow by means of directional flow vanes oriented to impart substantial resistance to spiral flow.

16. A process according to claim 14 in which the reaction mixture is continuously recirculated from a closed reaction zone through a heat exchange zone and returned to said reaction zone by means of a pump and the flow of said reaction mixture is guided to eliminate spiral flow patterns adjacent the circulation outlet of said reaction zone and adjacent the inlet of said pump.

References Cited

UNITED STATES PATENTS

| | | | |
|---|---|---|---|
| 1,836,325 | 12/1931 | James | 260—524 |
| 1,902,550 | 3/1933 | Forrest et al. | 260—524 |
| 3,155,718 | 11/1964 | Brown et al. | 260—524 |

OTHER REFERENCES

Cremer: Chem. Engineering Practice, vol. 6 1958, pp. 5–6.

LORRAINE A. WEINBERGER, Primary Examiner

R. S. WEISSBERG, Assistant Examiner

PO-1050
(5/69)

UNITED STATES PATENT OFFICE
CERTIFICATE OF CORRECTION

Patent No. 3,534,090    Dated October 13, 1970

Inventor(s)  HOWARD S. BRYANT, JR. ET AL

It is certified that error appears in the above-identified patent and that said Letters Patent are hereby corrected as shown below:

Column 3, line 38:   for "preheatnig" read -- preheating --

Column 5, line 22    for "is" read -- it --

Column 7, line 38    for "lops" read -- loops --

Column 8, line 52    for "with" read -- without --

Column 8, line 57    for "16" read -- 36 --

SIGNED AND
SEALED
DEC 29 1970

(SEAL)
Attest:

Edward M. Fletcher, Jr.
Attesting Officer

WILLIAM E. SCHUYLER, JR.
Commissioner of Patents